United States Patent
Rao Karikurve et al.

(10) Patent No.: US 12,536,184 B2
(45) Date of Patent: Jan. 27, 2026

(54) GENERATING EXPLANATIONS FOR ATYPICAL REPLACEMENTS USING LARGE LANGUAGE MACHINE-LEARNED MODELS

(71) Applicant: Maplebear Inc., San Francisco, CA (US)

(72) Inventors: Sharath Rao Karikurve, Berkeley, CA (US); Shrikar Archak, Newark, CA (US); Shishir Kumar Prasad, Fremont, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/933,807

(22) Filed: Oct. 31, 2024

(65) Prior Publication Data

US 2025/0139106 A1    May 1, 2025

Related U.S. Application Data

(60) Provisional application No. 63/594,677, filed on Oct. 31, 2023.

(51) Int. Cl.
  *G06F 7/00*      (2006.01)
  *G06F 16/2457*   (2019.01)
  *G06F 16/248*    (2019.01)
  *G06F 17/00*     (2019.01)

(52) U.S. Cl.
  CPC ...... *G06F 16/24578* (2019.01); *G06F 16/248* (2019.01)

(58) Field of Classification Search
  CPC .................. G06F 16/24578; G06F 16/248
  USPC ............................................ 707/727
  See application file for complete search history.

(56) References Cited

U.S. PATENT DOCUMENTS

| | | | |
|---|---|---|---|
| 10,410,272 B1* | 9/2019 | Johnson | G06Q 30/0633 |
| 11,127,067 B1* | 9/2021 | Levy | G06N 5/04 |
| 2016/0140643 A1* | 5/2016 | Nice | G06F 16/3344 |
| | | | 705/26.7 |
| 2019/0026806 A1* | 1/2019 | Kozina | G06Q 30/0627 |
| 2020/0012639 A1* | 1/2020 | Liu | G06Q 50/01 |
| 2021/0118036 A1* | 4/2021 | Jiang | G06N 20/00 |
| 2021/0233145 A1* | 7/2021 | Joshi | G06N 20/00 |
| 2024/0362582 A1* | 10/2024 | Luo | G06Q 10/087 |
| 2024/0403947 A1* | 12/2024 | Lin | G06Q 30/0643 |

* cited by examiner

*Primary Examiner* — Pavan Mamillapalli
(74) *Attorney, Agent, or Firm* — Fenwick & West LLP

(57) ABSTRACT

An online system performs an atypical replacement recommendation task in conjunction with a model serving system or the interface system to make recommendations to a user for replacing a target item with an atypical replacement item. The online system receives a search query from a user and identifies a target item based on the search query. The online system identifies a set of candidate items for replacing the target item. The online system may select one or more atypical replacement items in the set of candidate items, and generate an explanation for each atypical replacement item. The explanation provides a reason for using the atypical replacement item to replace the target item. The online system provides the atypical replacement items and the corresponding explanations as a response to the search query.

20 Claims, 4 Drawing Sheets

GENERATING EXPLANATIONS FOR ATYPICAL REPLACEMENTS USING LARGE LANGUAGE MACHINE-LEARNED MODELS

CROSS-REFERENCE TO RELATED APPLICATIONS

This application claims the benefit of U.S. Provisional Application No. 63/594,677, filed Oct. 31, 2023, which is incorporated by reference herein in its entirety.

BACKGROUND

An online system is an online platform that provides one or more online services. An example of an online service is allowing users to perform transactions associated with items. The items may represent physical entities stored in a physical location. A user can place an order for purchasing items from participating retailers via the online system, with the shopping being done by a picker. In current online systems, a customer creates a shopping list of items to be purchased from a retailer. To improve customer experience and account for varying availability, an online system may identify a target item that is desired by the user, and also recommend to a user various items to add to the shopping list when the user is building it. Current recommendation systems are based on previous purchase history and prior selections of replacement items by other customers when recommending the items. Often the recommendation systems recommend items that are obvious and popular. But these items are also more likely to be out of stock and not available to the users because of their popularity.

SUMMARY

In accordance with one or more aspects of the disclosure, the techniques described herein relate to a method for an online system that performs a language transformation task in conjunction with a model serving system or the interface system to provide an atypical replacement recommendation. An online system receives, from a client device, a search query from a user. The system may identify, based on the search query, a target item and a set of candidate items for replacing the target item. The system may determine a score of each candidate item, which indicates a probability that the user will select the candidate item for replacing the target item. Based on the determined score, the system may select one or more of the set of candidate items to form one or more replacement pairs with the target item, and each replacement pair includes one selected candidate item and the target item. The selected candidate item does not have a highest score among the set of candidate items. The system may generate a prompt for input to a machine-learned language model. The prompt may specify the formed replacement pairs and a request to generate an explanation for each of the formed replacement pairs, and the explanation includes a reason for using the selected candidate item to replace the target item. The system may provide the prompt to a model serving system for execution by the machine-learned language model, and receive an output that includes the explanation for each of the formed replacement pairs. The system then selects one or more candidate items from the replacement pairs as replacement items for the target item, and presents the selected candidate items with the corresponding explanations as a response to the search query to the user.

DETAILED DESCRIPTION

Figure 1A:
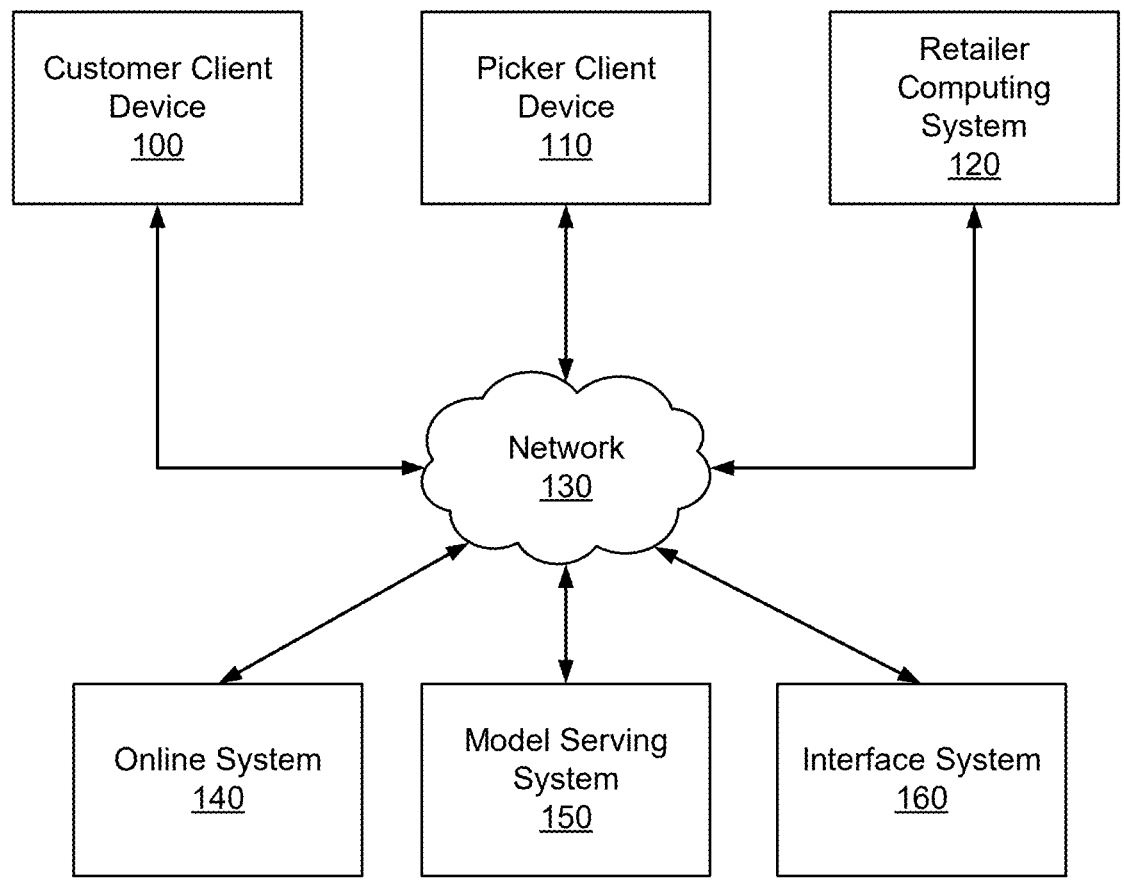
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi-or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one or more embodiments,, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, recommendation systems are often based on previous purchase history and prior selections of replacement items by other customers when recommending the items. However, the recommended replacement items may be limited because the user may not be aware of the atypical replacement items due to their knowledge/information gap. For example, a user searches for "hand sanitizer" but sees that all options, including their preferred brands and related products, are out of stock due to high demand. Without any alternatives offered (e.g., isopropyl alcohol), the user is unsure what to do next. They may not have enough product knowledge to know that alternatives like isopropyl alcohol can serve the same purpose for disinfection. This involves searching for terms like "hand sanitizer substitute" or "what to use instead of hand sanitizer." This additional confusion increases decision fatigue, making the shopping experience less enjoyable.

This disclosure herein provides a method and computer system for recommending atypical replacement items that may be especially helpful for users, as it guides the users toward alternative solutions they might not have considered or been aware of. Users with limited knowledge in one area or another may not be aware that alternatives exist for the specific product they are seeking. By recommending atypical replacement items, the online system 140 serves as a guide, offering expert suggestions that still fulfill the user's needs even if they are unfamiliar with other options. This helps users who may otherwise be stuck if their desired item is out of stock or unavailable. Instead of leaving them to search blindly or giving up, the online system 140 provides relevant alternatives, ensuring that the users can still find a suitable solution. In some cases, users may not always understand the specific ingredients or functions of the products they are looking for, which can make it difficult for them to find a suitable replacement when the original item is unavailable. Atypical replacement recommendations help fill these knowledge gaps by offering products that serve the same purpose. Even if the user does not know what alternatives to search for, the online system 140 steps in to provide relevant options that align with their original intent.

Additionally, the disclosed method uses LLMs to generate explanations for each atypical replacement item to at least explain a reason for replacing the target item with the recommended atypical replacement item. LLMs may generate explanations that are highly personalized to the specific item, user query, and situation. LLMs may analyze the context of the user's search or product need, providing detailed yet relevant explanations. This contextualization helps the user with the right level of information based on their unique needs, leading to more accurate and helpful recommendations. Additionally, LLMs excel at communicating complex ideas in a user-friendly and conversational tone, making it easier for users to understand the reasoning behind atypical recommendations without feeling overwhelmed by technical jargon.

In this way, the disclosed method simplifies the process by reducing the user's need for independent research, saving time, and offering instant, clear information. The disclosed method enriches the user's experience by building user confidence, tailoring suggestions to individual needs, and supporting product discovery. The atypical replacement recommendation with its corresponding explanation leads to faster decision-making, higher satisfaction, and a smoother, more engaging process.

In one or more embodiments, the online system 140 performs an atypical replacement recommendation task to recommend atypical replacement items for replacing a target item to a user. Specifically, the online system 140 prepares a prompt for input to the model serving system 150. The prompt may specify one or more atypical candidate replacement items and a request to generate an explanation for each of the atypical candidate replacement items. The explanation may include a reason for using the atypical candidate replacement item to replace the target item. The online system 140 receives a response to the prompt from the model serving system 150 based on execution of the machine-learned model using the prompt. The online system 140 obtains the response and evaluates the received explanation. Based on the explanation, the online system 140 may further select one or more atypical replacement items for replacement recommendations to the user. The online system 140 may provide the atypical replacement items and the corresponding explanations in response to the user's search query.

In one or more embodiments, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

In one or more embodiments, the online system 140 performs an atypical replacement recommendation task to recommend atypical replacement items for replacing a target item to a user. Specifically, the online system 140 provides a prompt to the interface system 160. The prompt may include one or more replacement pairs and a task request. Each replacement pair includes a target item and a candidate item for replacing the target item. The candidate item may be an atypical replacement item that is commonly used for replacing the target item. The task request may request the interface system 160 to generate an explanation for using the atypical replacement item for replacing the target item. The online system 140 provides a query to the interface system 160. The online system 140 receives a response to the prompt from the interface system 160 based on execution of the machine-learned model in the model serving system 150 using prompts generated by the interface system 160. The online system 140 obtains the response and evaluates the received explanation. Based on the explanation, the online system 140 may further select one or more atypical replacement items for replacement recommendations to the user. The online system 140 may provide the atypical replacement items and the corresponding explanations in as a response to the user's search query.

Figure 1B:
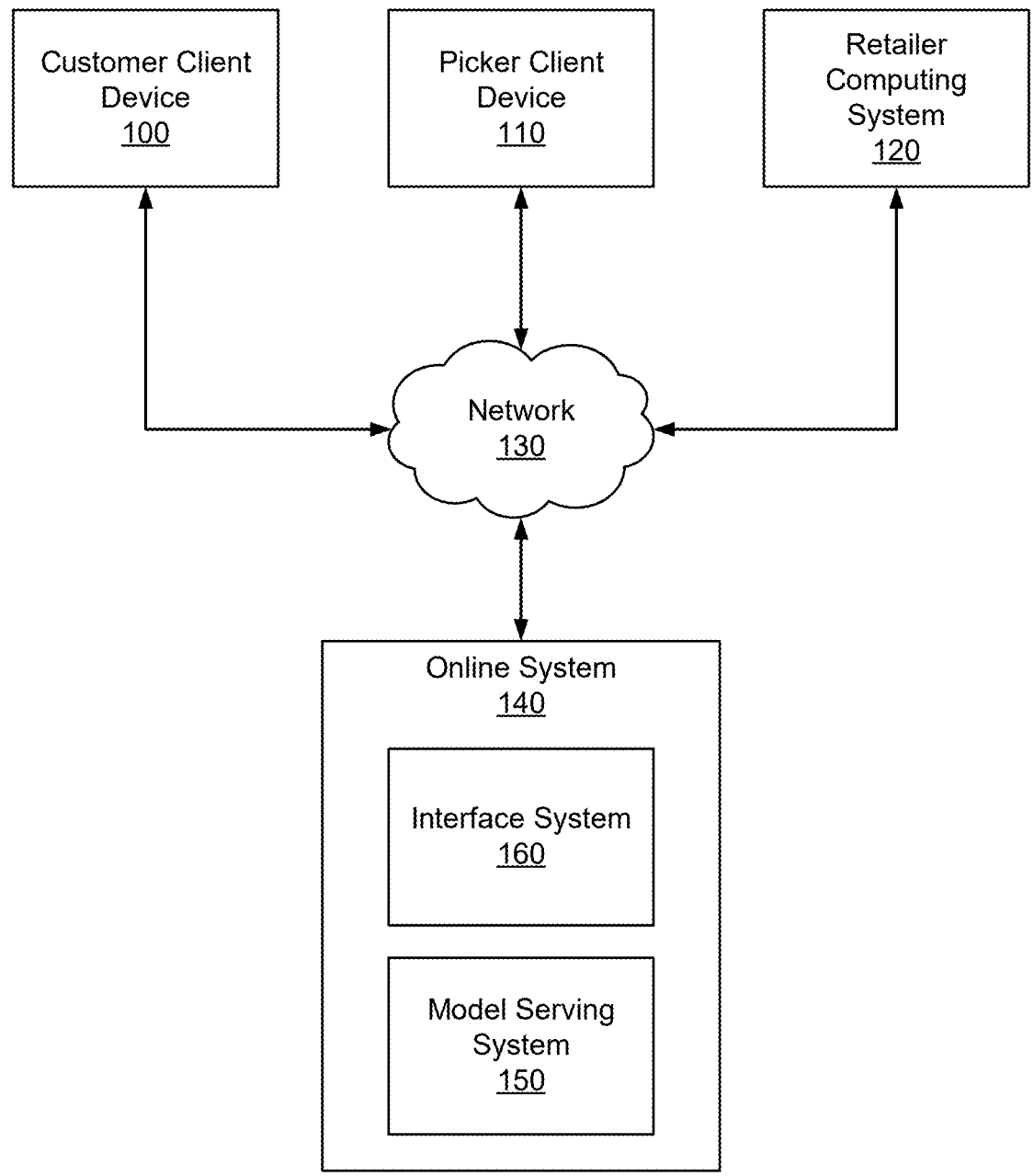
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140.

Figure 2:
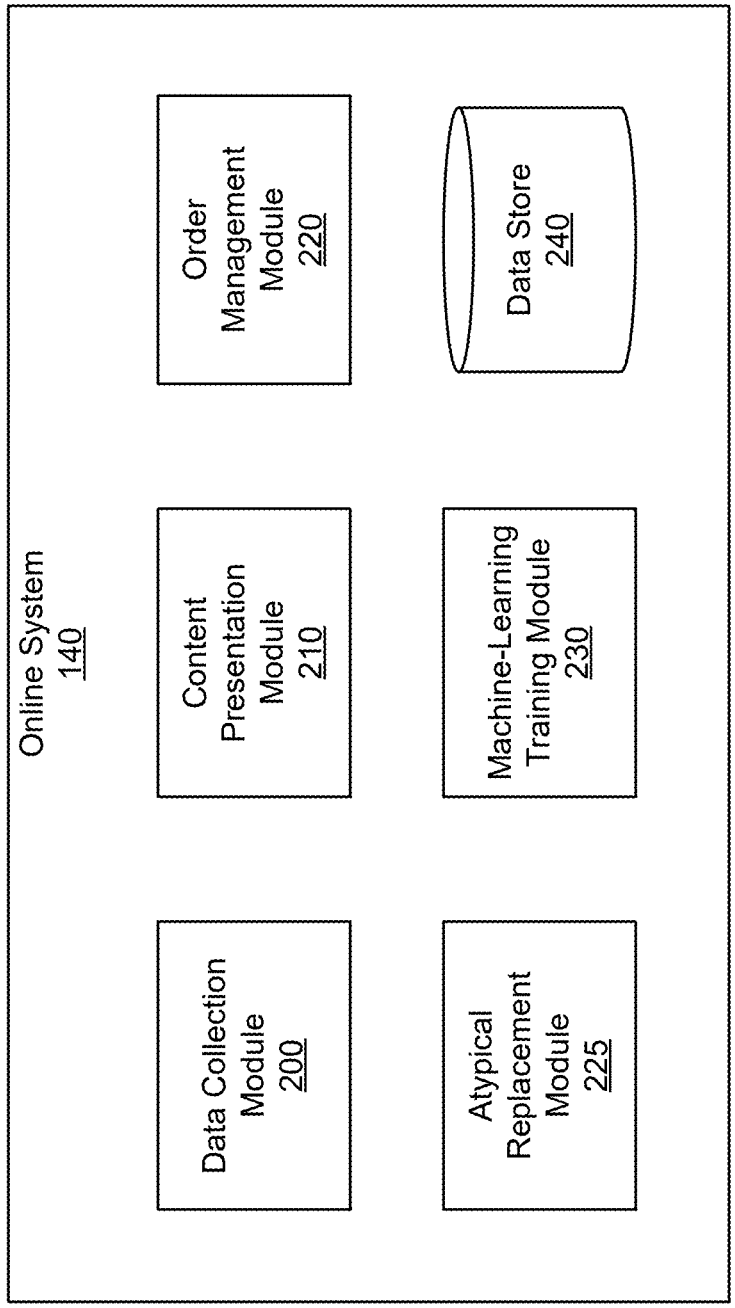
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, an atypical replacement module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and offers the orders to pickers for service based on picker data. For example, the order management module 220 offers an order to a picker based on the picker's location and the location of the retailer from which the ordered items are to be collected. The order management module 220 may also offers an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to offer an order to a picker based on a delivery timeframe requested by the customer with the order. The order management module 220 computes an estimated amount of time that it would take for a picker to collect the items for an order and deliver the ordered item to the delivery location for the order. The order management module 220 offers the order to a picker at a time such that, if the picker immediately services the order, the picker is likely to deliver the order at a time within the timeframe. Thus, when the order management module 220 receives an order, the order management module 220 may delay in offering the order to a picker if the timeframe is far enough in the future.

When the order management module 220 offers an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The atypical replacement module 225 performs an atypical replacement recommendation task to make recommendations to a user for replacing a target item with an atypical replacement item. In some implementations, the atypical replacement recommendation may include an explanation for each atypical replacement item, and the explanation provides a reason for using the corresponding atypical replacement item to replace the target item. Specifically, for a given target item, the atypical replacement module 225 identifies a list of target items and candidate item pairs. A candidate item in a pair is a potential replacement item for that target item or a potential item that can be recommended to be purchased together with the target item. The atypical replacement module 225 identifies a subset of pairs that are not obvious replacement items for the target item or are atypical replacement items for the target item. The atypical replacement module 225 requests a LLM to generate an explanation on why these candidate items are replacements for the target item—if the explanation satisfies a criterion, the atypical replacement module 225 may provide these explanations for these pairs to other modules of the online system 140, such that these candidate items can be suggested as replacements for the target item along with the LLM-generated explanation.

In some embodiments, the online system 140 may receive a search query input by a user from a client device. The search query may include one or more search terms that describe an item and/or product the user searches for. For example, a user may input "sanitizer," "hand sanitizer," "sanitizer refill," etc., to the online system 140. The online system 140 may identify a target item based on the search query. In some implementations, the online system 140 may access the data store 240 for identifying the target item. In some embodiments, the identified target item may be not available, e.g., out of stock, and a user may subsequently input a second search query, seeking replacements for the target item. In one example, the identified target item may be "hand sanitizer." In some implementations, the online system 140 may identify that a target item is not available, and automatically identify a replacement item for recommendation. In some implementations, the online system 140 may identify that a replacement item is not available and not recommend the replacement item as a result.

Responsive to the target item being not available, a user may subsequently input follow-up search query as replacements for the target item. For example, a commonly input follow-up/subsequent search query may be "sanitizer refill," "sanitizer wipes," "XXX branded sanitizer," etc. In some examples, users with certain knowledge/information may input atypical/uncommon subsequent search query for replacements. For example, a user who knows that isopropyl alcohol is a major ingredient of the hand sanitizer, may input "isopropyl alcohol" as a subsequent search query when the hand sanitizer is not available. The online system 140 may identify replacement items based on the subsequent search queries, and store the search queries in the data store 240 for building target item and candidate item pairs. In some embodiments, the data store 240 may include an item graph which includes relationships between items and attributes of items. Using the item graph, the online system 140 may identify the target item and the set of candidate items based on the user query and/or the search term included in the user query.

Specifically, for each target item, the atypical replacement module 225 identifies a list of target item and candidate item pairs. From the historical purchase data or historical search data, the atypical replacement module 225 identifies the list of target item and candidate item pairs. The candidate items for a target item may be items that were searched together (e.g., within a time window) with the target item, or items that were purchased together with the target item. The atypical replacement module 225 may determine a score for each candidate item. In some embodiments, the atypical replacement module 225 may apply a machine learned replacement model to each of the set of candidate items to output a score that is indicative of whether a user would accept the item as a replacement for the target item, i.e., a probability that the candidate item would be used to replace the first item. In some cases, the atypical replacement module 225 may input features that relate to users' engagement with the candidate items based on historical replacement data, such as a number of times (or percentage of times) that a candidate item has been used to replace the target item. For example, a number of times or proportions that a candidate item was purchased as a replacement for the target item after, for example, the user had identified the target item was unavailable.

In some embodiments, the atypical replacement module 225 may determine the score for each candidate item with statistics data. For example, the atypical replacement module 225 may calculate a point mutual information (PMI) between each candidate item and the target item. In calculating the PMI, the atypical replacement module 225 may calculate a measure of association, which compares the probability of two events occurring together to what this probability would be if the events were independent. For example, the atypical replacement module 225 may use the previous purchase history/search history, to compare the probability of a user searching for the target item (e.g., hand sanitizer) and the candidate item (e.g., "isopropyl alcohol") to the probability of a user searching for the target item (e.g., hand sanitizer) or the candidate item (e.g., "isopropyl alcohol") independently. Based on the PMI, the atypical replacement module 225 may determine a score for each candidate item which indicates how close the candidate item is associated with the target item. In some embodiments, the score may be the PMI value, alternatively, the score may be calculated based on the PMI value.

In one or more instances, the PMI for a target item and a respective candidate item is defined as a joint probability the target item and the candidate item were purchased together or the candidate item was identified to have been purchased as a replacement item for the target item (e.g., p(target item, candidate item) or number of instances in a given dataset where these items were purchased together) over the multiplication of probabilities each of the target item and the candidate item were purchased independently (e.g., p(target item)×p(candidate item) or number of instances each item was purchased). A higher value of PMI score indicates that there is a close association between the target item and the candidate item (e.g., as compared to a lower value of PMI score).

The atypical replacement module 225 then ranks the set of candidate items based on the score of each candidate item and selects one or more candidate items to form replacement pairs with the target item. In one instance, the atypical replacement module 225 identifies a subset of atypical items which are non-obvious or less obvious candidate items for replacing the target item. In one instance, the selected atypical candidate items do not have the highest ranking/score. Instead, the atypical replacement module 225 selects candidate items that have middle level scores, i.e., positioned in the middle of the ranking order/distribution. For example, the atypical replacement module 225 may set a threshold range of the scores, e.g., 25-75% percentile, and selects candidate items with scores positioned in the threshold range. For example, for a target item of "hand sanitizer," a typical/common replacement item may be "sanitizer refill," "sanitizer wipes," etc., which may be higher-ranked (e.g., top 10% percentile) in the ranked list, whereas "isopropyl alcohol," a major ingredient (75%, v/v) of the hand sanitizer, may be a less known/common replacement for "hand sanitizer."

In some situations, the common replacement items may be not available, for example, all sanitizer related products are out of stock. In this case, the atypical replacement module 225 may select "isopropyl alcohol" as a replacement recommendation to the user because it is less common and may be still available. In some embodiments, the atypical replacement module 225 may select one or more candidate items, e.g., "ethanol (ethyl alcohol)," "isopropyl alcohol," etc., and form a replacement pair for each candidate item and the target item, e.g., "hand sanitizer-ethanol (ethyl alcohol)," "hand sanitizer-isopropyl alcohol," etc.

For candidate items in the atypical subset, the atypical replacement module 225 constructs a prompt and a task request to the LLM for generating an explanation for the replacement pair. The explanation may provide a reason for using the candidate item to replace the target item. In some embodiments, the prompt may include the formed replacement pairs and a request to generate an explanation for each of the formed replacement pairs. An example prompt to the LLM of the model serving system 150 may be:

"This item "isopropyl alcohol" is used to replace a target item "hand sanitizer." Based on this information, please provide an explanation for using "isopropyl alcohol" to replace "hand sanitizer."

The atypical replacement module 225 may receive an output from the model serving system 150, and the output includes an explanation for using a candidate item to replace a target item. In one example, the received output may be:

"Isopropyl alcohol can be used as a substitute for hand sanitizer because it shares the key ingredient that makes hand sanitizers effective in killing germs and bacteria: alcohol. Hand sanitizers typically contain alcohol in the range of 60% to 70%, and isopropyl alcohol is one of the common types of alcohol used for this purpose."

The atypical replacement module 225 may evaluate the received explanation for each replacement pair. In some embodiments, the atypical replacement module 225 may evaluate whether the received explanation is a reasonable explanation, whether the received explanation is suitable for presenting to a user, whether the received explanation may be used as a part of replacement recommendation, etc. Based on the evaluation, the atypical replacement module 225 may determine whether the corresponding candidate item can be considered as a potential replacement item for recommendation to the user.

In some embodiments, to evaluate the received output, the atypical replacement module 225 may use a structured scoring approach based on several parameters/dimensions, such as, reasoning, language, and the like. The atypical replacement module may rate the explanation on a numerical scale (e.g., 1-5 or 1-10) in each dimension, assign weights to reflect their importance, and calculate a total weighted score. By setting a minimum threshold score, the atypical replacement module 225 may evaluate the quality of the explanation, and determine if the explanation meets a required standard. In some embodiments, the atypical replacement module 225 may evaluate the received explanations by scoring their clarity and relevance. In some embodiments, the atypical replacement module 225 may implement user testing or expert review to gather direct feedback on clarity, persuasiveness, etc.

In some implementations, the atypical replacement 225 may identify candidate items for the target item that have a good explanation, then provide these identified pairs to other modules of the online system 140 that are responsible for a replacement system that recommends replacement items to users when a target item is unavailable. In this way, the replacement system can also recommend atypical items to other users that were previously not obvious replacements for the target item, along with the explanation generated by the LLM.

In some embodiments, in addition to explain the reason for using the atypical item to replace the target item, the explanation generated by the LLM may highlight the characteristics and relevance of the suggested items. In some implementations, the explanation may explain how the atypical items differ from typical options and what advantages they offer, provide context and practical use cases. For example, an explanation for using UV sanitizer to replace alcohol-based sanitizer may include: "Unlike alcohol-based sanitizer which would damage your phone screens, with this UV sanitizer, you can quickly disinfect your phone, credit card, and personal items while on the go, ensuring your environment is always clean."

In some implementations, the LLM may be trained to generate explanations for atypical recommendations based on user preferences, item features, and contextual information. The LLM may be trained with a diverse training dataset that includes details about the items such as description, features, benefits and typical use cases. The training dataset may include user information such as user preferences, previous purchase history, and behavioral data. In some implementations, the training dataset may include training examples of successful explanations and/or persuasive copies, such as marketing materials, customer reviews, and information about common scenarios where users may seek recommendations (e.g., seasonality, cultural information, etc.) In some embodiments, the atypical replacement module 225 may fine-tune the LLM model by applying the LLM to a training example which includes a target item, an atypical replacement item and a corresponding explanation for the atypical replacement item. The atypical replacement module 225 receives an output from the LLM, and the output may include a generated explanation. The atypical replacement module 225 compares the generated explanation and the explanation included in the training example and generates a loss function indicating a difference between the explanation in the output and the explanation in the training example. The atypical replacement module 225 may fine-tune the LLM by backpropagating the LLM to update parameters of the LLM obtained from computed loss from the loss function.

In some implementations, the training process of the LLM may include a feedback loop. In some examples, the feedback loop may include user feedback that is collected from users. In some examples, the feedback loop may include adaptive learning that uses reinforcement learning techniques to adapt the LLM based on user interactions and preferences. In some implementations, the atypical replacement module 225 may collect feedback from users after users interact with the atypical recommendations and explanations, via survey and questionnaires, user interface elements (e.g., thumbs up/down), comments and suggestions, and the like. In some implementations, the feedback may be generated based on the user's behavioral data, e.g., click-though rate that measures how often users interact with the recommended atypical items after seeing the explanation, conversion rate that tracks whether users purchase the atypical items after receiving the explanations, etc. The atypical replacement module 225 analyzes the user feedback quantitatively and/or qualitatively. The atypical replacement module 225 may assign numerical values to an explanation to indicate a quality of the explanation. The quality of the explanation may be associated with the clarity of the explanation, the user feedback, the outcome (such as click through rate, conversion rate, etc.) and the like. The atypical replacement module 225 uses the evaluation of the explanations to refine the LLM and fine-tune the explanations. For instance, if users find technical jargon off-putting, the atypical replacement module 225 may modify the language of the explanations to be more accessible and relatable.

Incorporating a feedback loop for atypical replacement recommendations is important since these recommendations may not align with conventional choices, making user insights particularly valuable in ensuring their effectiveness and acceptance. In some embodiments, atypical recommendations may target specific user needs or preferences that typical items do not address, and collecting user feedback helps to understand these unique needs better. In some cases, atypical recommendations may initially be based on assumptions or trends. The feedback loop allows the LLM to adapt and improve based on actual user behavior and reactions. By analyzing user feedback on the explanations provided for atypical recommendations, the LLM may be refined to learn how to communicate benefits and features, increasing the chances of purchase.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine-tune the parameters of the transformer model using training data stored in the data store 240. The machine-learning training module 230 may provide the model to the model serving system 150 for deployment.

Figure 3:
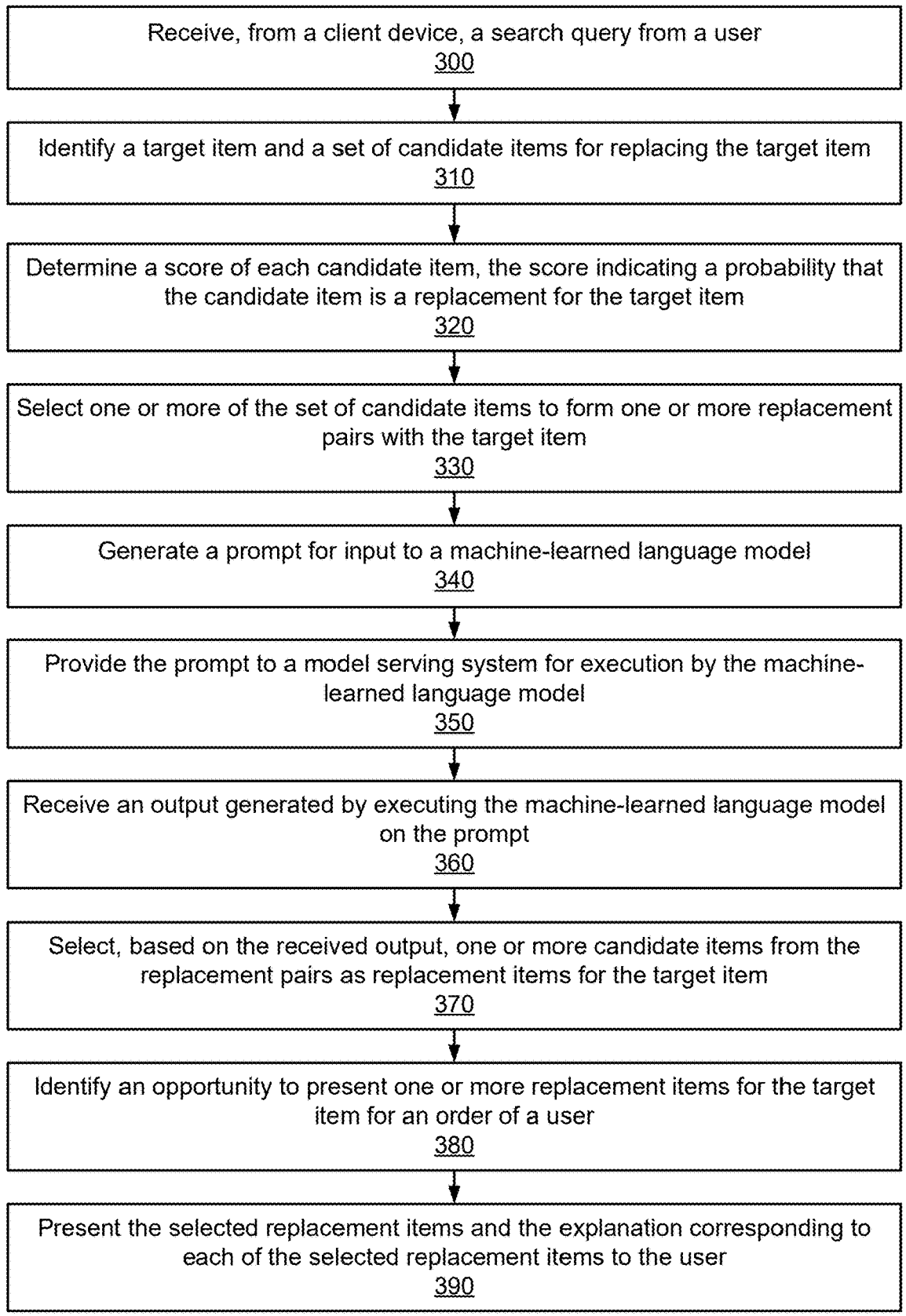
FIG. 3 is a flowchart for generating atypical replacement recommendations with explanations, in accordance with one or more embodiments.

FIG. 3 is a flowchart for a method of generating atypical replacement recommendations with explanations, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system 140 receives 300, from a client device, a search query from a user. The online system 140 identifies 310, based on the search query, a target item and a set of candidate items for replacing the target item. The online system 140 determines 320 a score of each candidate item. The score may indicate a probability that the candidate item is a replacement for the target item. The online system 140 selects 330, based on the determined score of each candidate item, one or more of the set of candidate items to form one or more replacement pairs with the target item.

In some embodiments, the online system 140 may apply a machine learned model in determining the set of candidate items. For example, the online system 140 may input the target item to the machine learned model and predict a set of candidate items with scores indicating the probabilities that a candidate item is a replacement for the target item. In some embodiments, the machine learned model may be trained using training datasets, which may be periodically updated with recent purchase orders. The training datasets may be updated with item replacement information. Following updating of the training datasets, the machined learned model may be retrained with the updated training datasets.

Each replacement pair may include one selected candidate item and the target item, and the selected candidate item does not have a highest score among the set of candidate items. The online system 140 generates 340 a prompt for input to a machine-learned language model. The prompt specifies the formed replacement pairs and a request to generate an explanation for each of the formed replacement pairs, and the explanation explains a reason for using the selected candidate item to replace the target item. The online system 140 provides 350 the prompt to a model serving system for execution by the machine-learned language model. The online system 140 receives 360, from the model serving system, an output generated by executing the machine-learned language model on the prompt. The output may include the explanation for each of the formed replacement pairs. The online system 140 selects 370, based on the received output, one or more candidate items from the replacement pairs as replacement items for the target item. The online system 140 identifies 380 an opportunity to present one or more replacement items for the target item for an order of a user. The online system 140 presents 390 the selected replacement items and the explanation corresponding to each of the selected replacement items. In some embodiments, the opportunity may refer to an instance where a typical product (e.g., hand sanitizer or wipes) are out of stock. The user may be more open to trying atypical alternatives because they are available. In some embodiments, the opportunity may be related to the characteristics of the atypical items, user's preference, perceived added value or benefits, and the like. For example, the online system 140 may identify a user's preferences, e.g., users who are health-conscious, eco-friendly, or focused on sustainability may prefer essential oils with antimicrobial properties over chemical-based sanitizers. The online system 140 may identify atypical items related to the user's preferences and use it as an opportunity to present the atypical items as recommended replacement items. For example, the online system 140 may recommend an atypical item, e.g., a DIY hand sanitizer kit using essential oils, because it aligns with the user's eco-friendly values. In some embodiments, the user may select the replacement item and add the item to the cart. In some embodiments, the online system 140 may automatically add the replacement item to the user's cart without further user intervention.

In one or more embodiments, the online system 140 may present the selected replacement items and the corresponding explanations in a user interface. The user interface may include a set of interactable user interface elements, each corresponding to a selected replacement item. In some implementations, both typical replacement items and atypical replacement items may be presented to the user, and the user interface may present them into two groups. Each group may be included in an interactable user interface element. As an example, the user interface element may be labeled with information/messages, such as "Atypical Replacement Items," and the like. When a user performs an interactive action with (e.g., clicks, tabs, hovers, etc.) the user interface element, e.g., the online system 140 may cause the user interface element to show all atypical replacement items.

In some embodiments, the online system 140 may present each atypical replacement item in an interactive user interface element. The user interface element may initially not show the corresponding explanation, and when a user performs an interactive action with the user interface element, the user interface element will modify to show the corresponding explanations. In some embodiments, the positions of the interactable user interface elements may be determined based on users' historical interactive actions with the user interface elements, such as, users' click rate, interaction frequency, interaction time intervals etc. For example, more frequently interacted interactable user interface elements may be moved to a more prominent position, e.g., the first position in the row. The online system 140 may rank the interface elements based on each interface element's interaction history, such as rate, frequency, time interval, etc., and arrange the positions of the interface elements in the user interface based on each interface element's ranking position.

In one instance, the online system 140 identifies a user frequently interacts with the user interface element that represents the atypical replacement items. The online system 140 may arrange the position of the user interface element "Feel Special Today?" to the first position (e.g., a more prominent position than the user interface element displaying the typical replacement items) when displaying replacement items to the user. In another instance, the online system 140 may prioritize and position the user interface element "Atypical Replacement Items" next to a target item so that the user does not have to click through other user interface elements, such as "replacement," "shopping cart," etc., and/or scrolling up/down the user interface, to view the atypical replacement items. In another example, the online system 140 may determine the user frequently spends time on reading the explanations. When presenting the atypical replacement items, the online system 140 may cause the user interface to display the explanations directly. In some cases, the online system 140 may highlight the explanations with certain visual effects (e.g., changing font size, color, position of the text, etc.) to help the user to view the explanations. In some embodiments, the positions and display of the interactable user interface elements may be determined based on user usage of a large population. In some embodiments, the position of the interactable user interface elements may be customized to meet a specific user's need/preference. In some embodiments, the user is able to select a replacement item which may add the replacement item to the user's order with or without a separate explanation.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
   identifying, based on a search query, a target item and a set of candidate items for replacing the target item;
   generating a score of each candidate item, the score of each candidate item indicating a probability that the candidate item is a replacement for the target item;
   ranking the set of candidate items for the target item based on the score for the set of candidate items;
   selecting, based on the ranking of each candidate item, at least one or more of the set of candidate items to form one or more replacement pairs with the target item, wherein each replacement pair comprises a selected candidate item, and the target item and the selected candidate item is between a first percentile and a second percentile;
   generating a prompt for input to a machine-learned language model, the prompt specifying the formed replacement pairs and a request to generate an explanation for each of the formed replacement pairs for using the selected candidate items to replace the target item;
   receiving an output generated by executing the machine-learned language model on the prompt, the output comprising the explanation for each of the formed replacement pairs;
   selecting, based on the received output, a subset of candidate items from the replacement pairs as replacement items for the target item;
   identifying an instance to present the replacement items for the target item for an order of a user; and
   transmitting instructions to a client device of the user to cause display of the selected replacement items and the explanation corresponding to each of the selected replacement items to the user, further comprising presenting the selected replacement items as a first group in an interface element, and presenting common replacement items for the target item as a second group in another interface element, where the common replacement items include candidate items with rankings above the second percentile.

2. The method of claim 1, further comprising:
   receiving a selection of one of the replacement items from the client device; and
   adding the selected one replacement item to the order.

3. The method of claim 1, further comprising:
   fine-tuning the machine-learned language model to generate an updated machine-learned language model, the fine-tuning further comprising:
      applying the machine-learned language model to a training example, the training example comprising a target item, an atypical replacement item and a corresponding explanation for the atypical replacement item for replacing the target item;
      generating, by the machine-learned language model, a response comprising a generated explanation for the atypical replacement item in the training example;
      generating a loss function indicating a difference between the generated explanation and the explanation included in the training example; and
      backpropagating terms from the loss function to update parameters of the machine-learned language model.

4. The method of claim 1, wherein transmitting the instructions to the client device comprises:
   transmitting the instructions to cause display of the explanation corresponding to each of the selected replacement items to the user, wherein each selected replacement item is displayed in an interactable user interface element in the user interface.

5. The method of claim 1, wherein transmitting the instructions to the client device comprises:
   transmitting the instructions to cause display, via a user interface, the selected replacement items to the user, wherein each selected replacement item is displayed in an interactable user interface element in the user interface;
   receiving, from the user, an interactive action with at least one user interface element; and
   modifying the user interface to display the explanation corresponding to the selected replacement item included in the at least one user interface element.

6. The method of claim 5, further comprising:
   modifying positions of the user interface elements displayed in the user interface based on historical interactive actions with the user interface elements.

7. The method of claim 1, wherein generating the score of each candidate item comprises:
   calculating a point mutual information (PMI) between each candidate item and the target item, wherein the PMI between the target item and a respective candidate item is computed as a probability of instances the candidate item was purchased with the target item or was a replacement for the target item over a multiplication of a probability of instances the candidate item was purchased and a probability of instances the target item was purchased.

8. The method of claim 1, wherein identifying an instance to present one or more replacement items for the target item for an order of a user comprises: identifying that the target item is not available.

9. A computer program product comprising a non-transitory computer readable storage medium having instructions encoded thereon that, when executed by a processor, cause the processor to perform steps comprising:
   identifying, based on a search query, a target item and a set of candidate items for replacing the target item;
   generating a score of each candidate item, the score of each candidate item indicating a probability that the candidate item is a replacement for the target item;
   ranking the set of candidate items for the target item based on the score for the set of candidate items;
   selecting, based on the ranking of each candidate item, at least one or more of the set of candidate items to form one or more replacement pairs with the target item, wherein each replacement pair comprises a selected candidate item, and the target item and the selected candidate item is between a first percentile and a second percentile;
   generating a prompt for input to a machine-learned language model, the prompt specifying the formed replacement pairs and a request to generate an explanation for each of the formed replacement pairs for using the selected candidate item to replace the target item;

receiving an output generated by executing the machine-learned language model on the prompt, the output comprising the explanation for each of the formed replacement pairs;

selecting, based on the received output, a subset of candidate items from the replacement pairs as replacement items for the target item;

identifying an instance to present the replacement items for the target item for an order of a user; and transmitting instructions to a client device of the user to cause display of the selected replacement items and the explanation corresponding to each of the selected replacement items to the user, further comprising presenting the selected replacement items as a first group in an interface element, and presenting common replacement items for the target item as a second group in another interface element, where the common replacement items include candidate items with rankings above the second percentile.

10. The computer program product comprising a non-transitory computer readable storage medium of claim 9, wherein the instructions, when executed by a processor, cause the processor to perform steps comprising:

receiving a selection of one of the replacement items from the client device; and adding the selected one replacement item to the order.

11. The computer program product comprising a non-transitory computer readable storage medium of claim 9, wherein the instructions, when executed by a processor, cause the processor to perform steps comprising:

fine-tuning the machine-learned language model to generate an updated machine-learned language model, the fine-tuning comprising:

applying the machine-learned language model to a training example, the training example comprising a target item, an atypical replacement item and a corresponding explanation for the atypical replacement item for replacing the target item;

generating, by the machine-learned language model, a response comprising a generated explanation for the atypical replacement item in the training example;

generating a loss function indicating a difference between the generated explanation and the explanation included in the training example; and backpropagating terms from the loss function to update parameters of the machine-learned language model.

12. The computer program product comprising a non-transitory computer readable storage medium of claim 9, wherein the instructions to transmit the instructions to the client device cause the processor to perform steps comprising:

transmitting the instructions to cause display of the explanation corresponding to each of the selected replacement items to the user, wherein each selected replacement item is displayed in an interactable user interface element in the user interface.

13. The computer program product comprising a non-transitory computer readable storage medium of claim 9, wherein the instructions to transmit the instructions to the client device cause the processor to perform steps comprising:

transmitting the instructions to cause display, via a user interface, the selected replacement items to the user, wherein each selected replacement item is displayed in an interactable user interface element in the user interface;

receiving, from the user, an interactive action with at least one user interface element; and modifying the user interface to display the explanation corresponding to the selected replacement item included in the at least one user interface element.

14. The computer program product comprising a non-transitory computer readable storage medium of claim 12, wherein the instructions, when executed by a processor, cause the processor to perform steps comprising:

modifying positions of the user interface elements displayed in the user interface based on historical interactive actions with the user interface elements.

15. The computer program product comprising a non-transitory computer readable storage medium of claim 9, wherein the instructions to generate the score of each candidate item, cause the processor to perform steps comprising:

calculating a point mutual information (PMI) between each candidate item and the target item, wherein the PMI between the target item and a respective candidate item is computed as a probability of instances the candidate item was purchased with the target item or was a replacement for the target item over a multiplication of a probability of instances the candidate item was purchased and a probability of instances the target item was purchased.

16. A computer system comprising:

a processor; and a non-transitory computer-readable storage medium having instructions that, when executed by the processor, cause the computer system to perform steps comprising:

identifying, based on a search query, a target item and a set of candidate items for replacing the target item;

generating a score of each candidate item, the score of each candidate item indicating a probability that the candidate item is a replacement for the target item;

ranking the set of candidate items for the target item based on the score for the se of candidate items;

selecting, based on the ranking of each candidate item, at least one or more of the set of candidate items to form one or more replacement pairs with the target item, wherein each replacement pair comprises a selected candidate item, and the target item and the selected candidate item is between a first percentile and a second percentile;

generating a prompt for input to a machine-learned language model, the prompt specifying the formed replacement pairs and a request to generate an explanation for each of the formed replacement pairs for using the selected candidate item to replace the target item;

receiving an output generated by executing the machine-learned language model on the prompt, the output comprising the explanation for each of the formed replacement pairs;

selecting, based on the received output, a subset of candidate items from the replacement pairs as replacement items for the target item;

identifying an instance to present the replacement items for the target item for an order of a user; and transmitting instructions to a client device of the user to cause display of the selected replacement items and the explanation corresponding to each of the selected replacement items to the user, further comprising presenting the selected replacement items as a first group in an interface element, and presenting common replacement items for the target item as a second group in another interface element, where the common replacement items include candidate items with rankings above the second percentile.

17. The system of claim 16, wherein the instructions, when executed by a processor, cause the computer system to perform steps comprising:
    finetuning the machine-learned language model to generate an updated machine-learned language model, the finetuning comprising:
        applying the machine-learned language model to a training example, the training example comprising a target item, an atypical replacement item and a corresponding explanation for the atypical replacement item replacing the target item;
        generating, by the machine-learned language model, a response comprising a generated explanation for the atypical replacement item in the training example;
        generating a loss function indicating a difference between the generated explanation and the explanation included in the training example; and
        backpropagating terms from the loss function to update parameters of the machine-learned language model.

18. The system of claim 16, wherein the instructions to transmit the instructions to the client device cause the computer system to perform steps comprising:
    transmitting the instructions to cause display the explanation corresponding to each of the selected replacement items to the user, wherein each selected replacement item is displayed in an interactable user interface element in the user interface.

19. The system of claim 16, wherein the instructions to transmit the instructions to the client device cause the computer system to perform steps comprising:
    transmitting the instructions to cause display, via a user interface, the selected replacement items to the user, wherein each selected replacement item is displayed in an interactable user interface element in the user interface;
    receiving, from the user, an interactive action with at least one user interface element; and
    modifying the user interface to display the explanation corresponding to the selected replacement item included in the at least one user interface element.

20. The system of claim 19, wherein the instructions, when executed by a processor, cause the computer system to perform steps comprising:
    modifying positions of the user interface elements displayed in the user interface based on historical interactive actions with the user interface elements.

* * * * *